(12) United States Patent
Dufour et al.

(10) Patent No.: US 11,897,043 B2
(45) Date of Patent: Feb. 13, 2024

(54) CUTTING INSERTS FOR USE IN MILLING TOOLS

(71) Applicant: Kennametal Inc., Latrobe, PA (US)

(72) Inventors: Jean Luc D. Dufour, Greensburg, PA (US); Gilles Festeau, Cessy (FR)

(73) Assignee: KENNAMETAL INC., Latrobe, PA (US)

( * ) Notice: Subject to any disclaimer, the term of this patent is extended or adjusted under 35 U.S.C. 154(b) by 87 days.

(21) Appl. No.: 17/566,916

(22) Filed: Dec. 31, 2021

(65) Prior Publication Data
US 2023/0211424 A1 Jul. 6, 2023

(51) Int. Cl.
*B23C 5/20* (2006.01)
*B23C 5/06* (2006.01)

(52) U.S. Cl.
CPC ........... *B23C 5/202* (2013.01); *B23C 5/06* (2013.01); *B23C 2200/0455* (2013.01); *B23C 2200/125* (2013.01); *B23C 2200/28* (2013.01)

(58) Field of Classification Search
CPC ... B23C 5/202; B23C 5/06; B23C 2200/0455; B23C 2200/28; B23C 2200/125; B23C 2210/204; B23C 5/2243; B23C 5/2247; B23C 2200/0461; B23C 2200/0433; B23C 2200/0494
See application file for complete search history.

(56) References Cited

U.S. PATENT DOCUMENTS

| | | | | |
|---|---|---|---|---|
| 5,454,670 A | * | 10/1995 | Noda | B23C 5/2278 407/42 |
| 5,466,097 A | * | 11/1995 | Wallstrom | B23C 5/202 407/113 |
| 6,543,970 B1 | | 4/2003 | Qvarth et al. | |
| 7,220,083 B2 | * | 5/2007 | Festeau | B23C 5/202 407/113 |
| 8,157,489 B2 | * | 4/2012 | Wolf | B23B 27/141 407/113 |

(Continued)

FOREIGN PATENT DOCUMENTS

CN 110449649 A 11/2019
RU 2645531 C1 2/2018

OTHER PUBLICATIONS

Oct. 20, 2022 Foreign Office Action in Application No. 365778-001, 2 pages.

(Continued)

*Primary Examiner* — Sara Addisu
(74) *Attorney, Agent, or Firm* — Christopher J. Owens

(57) ABSTRACT

Cutting inserts are disclosed having four cutting edges and milling tools comprising the cutting inserts installed in pockets on a rotatable cutting tool holder. The cutting inserts comprise a front face, a rear face and four side faces extending between the front and rear faces. A cutting edge is provided at the intersection of the front face and each side face. Each cutting edge comprises a plurality of cutting edge segments, including a facet cutting edge that forms the flat surface of a workpiece being milled, and a straight lead cutting edge that extends at an angle away from the facet cutting edge. The lead cutting edge angle is selected to provide effective milling of the workpiece at entry. The cutting inserts have side seating surfaces that allow the inserts to be more stably supported in cutting insert pockets.

26 Claims, 12 Drawing Sheets

(56) References Cited

U.S. PATENT DOCUMENTS

| | | | |
|---|---|---|---|
| 9,446,460 B2 | 9/2016 | Festeau et al. | |
| 10,092,965 B2* | 10/2018 | Burtscher | B23C 5/06 |
| 10,512,975 B2* | 12/2019 | Roman | B23C 5/202 |
| 11,583,942 B2* | 2/2023 | Passov | B23C 5/20 |
| 2005/0084342 A1* | 4/2005 | Festeau | B23C 5/06 |
| | | | 407/113 |
| 2007/0269278 A1 | 11/2007 | Scherbarth | |
| 2008/0304924 A1 | 12/2008 | Engstrom et al. | |
| 2009/0285646 A1 | 11/2009 | Oprasic et al. | |
| 2010/0272526 A1 | 10/2010 | Dufour et al. | |
| 2012/0275868 A1* | 11/2012 | Saito | B23C 5/06 |
| | | | 407/42 |
| 2012/0301235 A1 | 11/2012 | Yoshioka et al. | |
| 2012/0308318 A1* | 12/2012 | Burtscher | B23C 5/202 |
| | | | 407/113 |
| 2017/0066065 A1 | 3/2017 | Burtscher | |
| 2019/0160563 A1 | 5/2019 | Ballas | |
| 2019/0240745 A1* | 8/2019 | Noshita | B23C 5/06 |
| 2023/0132425 A1* | 5/2023 | Nishikoori | B23C 5/109 |
| | | | 407/113 |

OTHER PUBLICATIONS

Jul. 17, 2023 Foreign Office Action Chinese Application No. CN202230397146, 2 Pages.

* cited by examiner

CUTTING INSERTS FOR USE IN MILLING TOOLS

FIELD OF THE INVENTION

The present invention relates to cutting inserts, and more particularly relates to cutting inserts for use in milling tools.

BACKGROUND INFORMATION

Various metal-cutting methods are known, including milling, drilling, turning, broaching, reaming and tapping. A face milling tool or face mill produces a flat workpiece surface by action of the tool. In a typical face milling application, a milling cutter tool comprising a number of cutting inserts installed in pockets of a rotatable tool holder may be driven by a spindle on a longitudinal rotation axis oriented perpendicularly to the surface being milled.

SUMMARY OF THE INVENTION

The present invention provides cutting inserts having four cutting edges and milling tools comprising the cutting inserts installed in pockets on a rotatable cutting tool holder. The cutting inserts comprise a front face, a rear face and four side faces extending between the front and rear faces. A cutting edge is provided at the intersection of the front face and each side face. Each cutting edge comprises a plurality of cutting edge segments, including a facet cutting edge that forms the flat surface of a workpiece being milled, and a straight lead cutting edge that extends at an angle away from the facet cutting edge. The lead cutting edge angle is selected to provide effective milling of the workpiece at entry. The cutting inserts have side seating surfaces that allow the inserts to be more stably supported in cutting insert pockets.

An aspect of the present invention is to provide a cutting insert comprising a front face, a rear face, a plurality of side faces, wherein each side face extends between the front face and the rear face, and a cutting edge at an intersection of the front face and each side face. Each cutting edge comprises a facet cutting edge and a straight angled lead cutting edge extending from the facet cutting edge at a lead cutting edge angle with respect to the facet cutting edge of from 5° to 40°.

Another aspect of the present invention is to provide a cutting insert for installation on a rotatable cutting tool holder. The cutting insert comprises a front face, a rear face, a plurality of side faces, wherein each side face extends between the front face and the rear face and comprises a side seating surface structured and arranged to seat against an insert pocket of the cutting tool holder, a cutting edge comprising a straight angled lead cutting edge at an intersection of the front face and a side lead surface of each side face, and a rear corner foot extending from the side lead surface defining a rear corner intersection line with the side lead surface. The side seating surface comprises a forward seating surface boundary intersecting the side lead surface, a rear seating surface boundary intersecting the rear face, and a rear corner foot seating surface boundary intersecting the rear corner foot.

A further aspect of the present invention is to provide a cutting tool holder and cutting insert assembly comprising a rotatable cutting tool holder having a longitudinal rotation axis and comprising a plurality of cutting insert pockets, and a plurality of cutting inserts insertable into the cutting insert pockets. Each cutting insert comprises a front face, a rear face, a plurality of side faces, and a cutting edge at an intersection of the front face and each side face. Each side face extends between the front face and the rear face and comprises a side seating surface and a cutting edge. Each cutting edge comprises a facet cutting edge and a straight angled lead cutting edge extending from the facet cutting edge at a lead cutting edge angle with respect to the facet cutting edge of from 5° to 40°. Each cutting insert pocket comprises a rear seating surface structured and arranged to engage the rear face of the cutting insert, a first side wall seating surface structured and arranged to engage one of the side seating surfaces of the cutting insert, and a second side wall seating surface structured and arranged to engage another one of the side seating surfaces of the cutting insert.

These and other aspects of the present invention will be more apparent from the following description.

DETAILED DESCRIPTION

Figure 1:
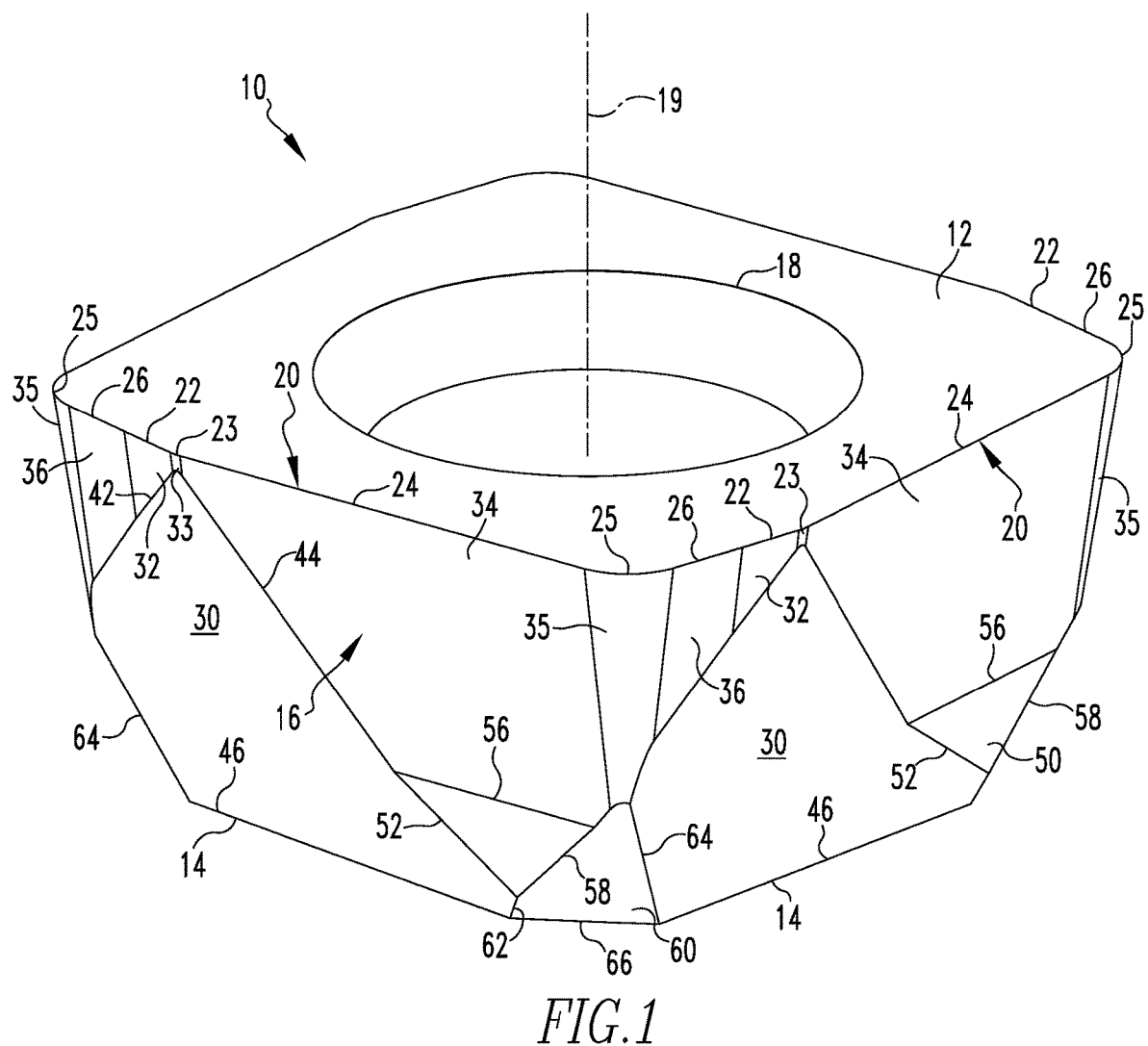
FIG. 1 is a front isometric view of a cutting insert in accordance with an embodiment of the present invention.
Figure 2:
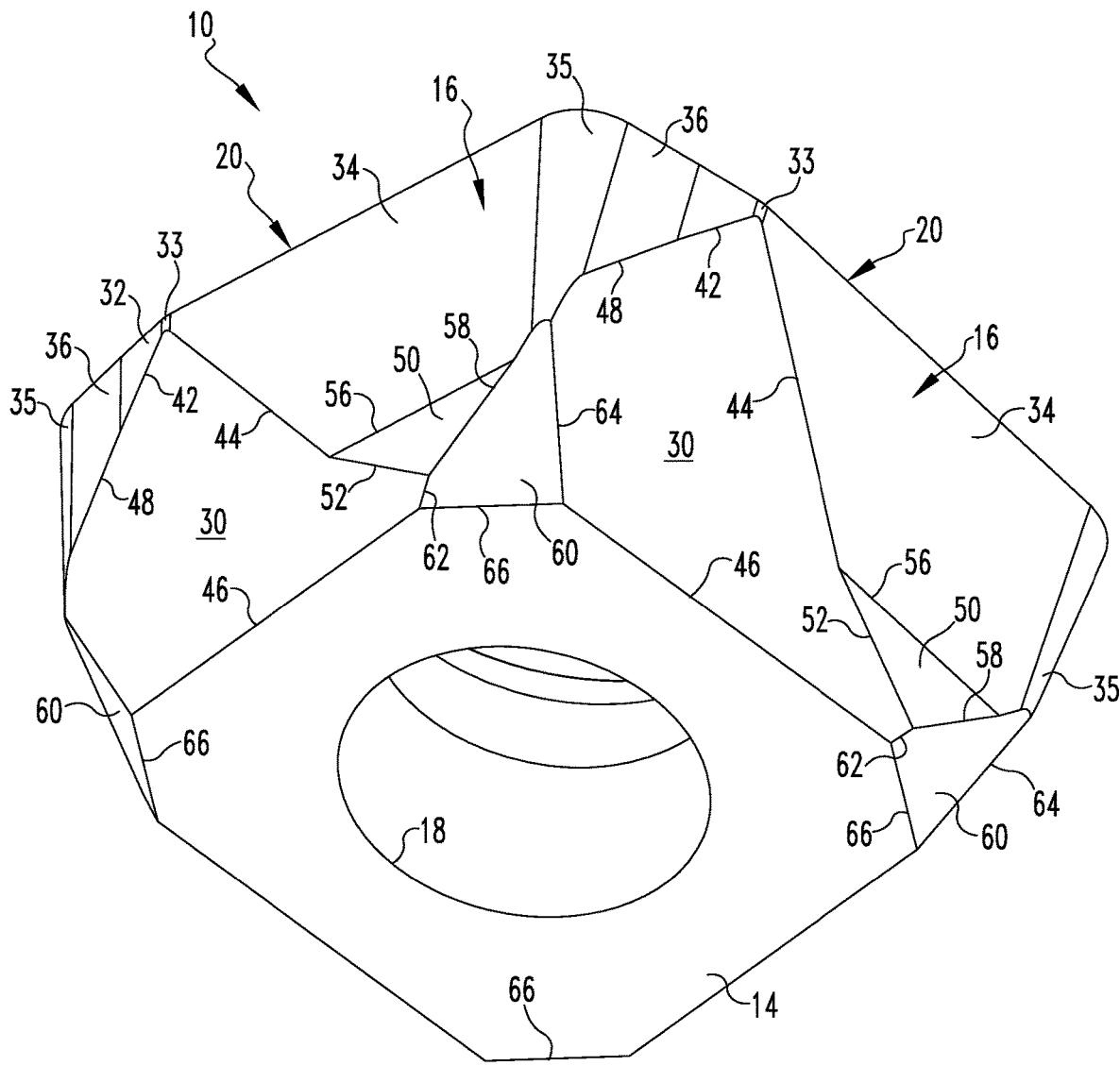
FIG. 2 is a rear isometric view of the cutting insert of FIG. 1.

FIGS. 1-6 illustrate a cutting insert 10 in accordance with an embodiment of the present invention. The cutting insert 10 includes a front face 12 and a rear face 14. Four side faces 16 extend between the front face 12 and the rear face 14. A central hole 18 is provided through the cutting insert 10 from the front face 12 to the rear face 14. The central hole 18 defines a central longitudinal axis 19 of the cutting insert. In the embodiment shown, the cutting insert 10 has 90° rotational symmetry around the central longitudinal axis 19.

Figure 3:
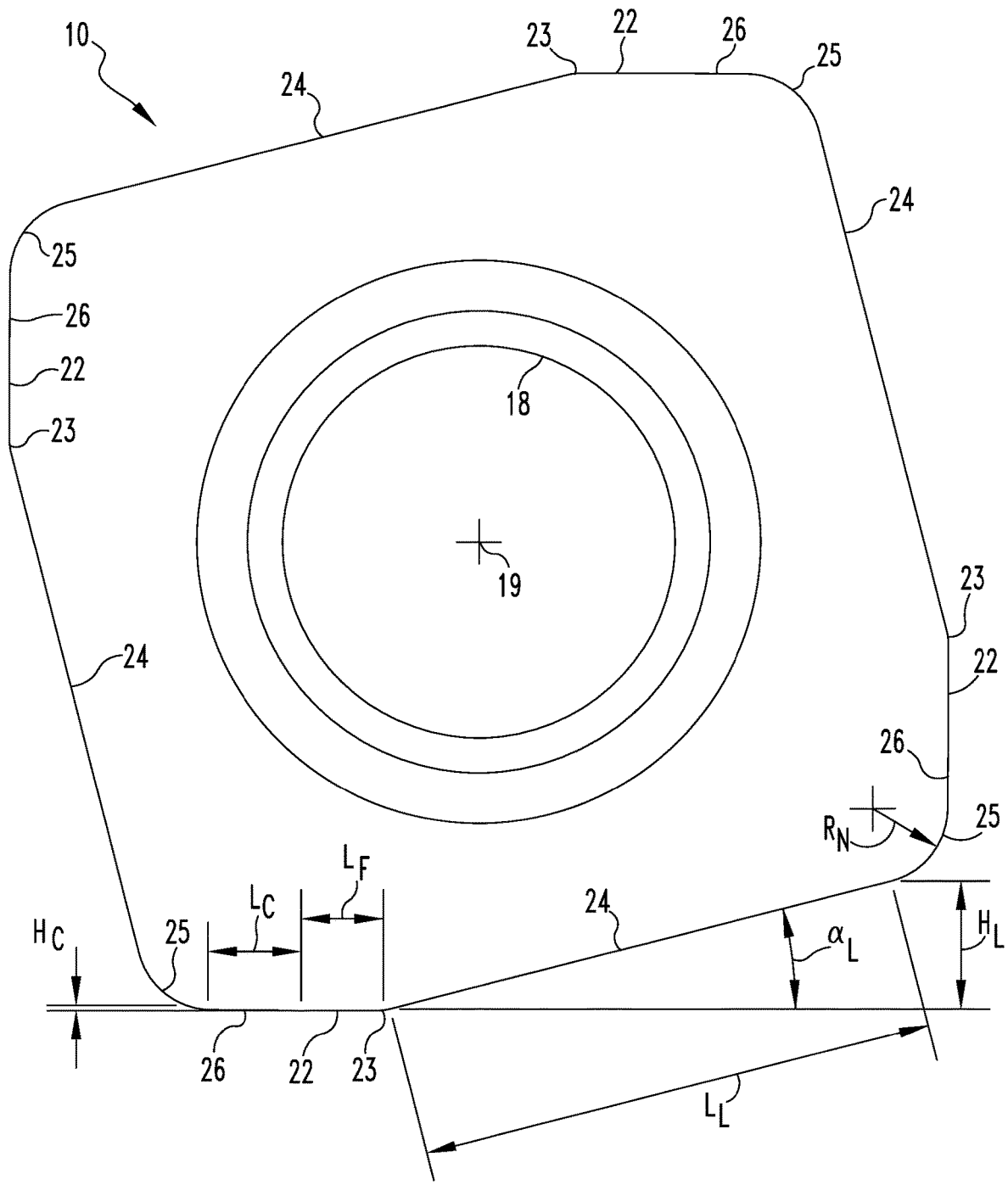
FIG. 3 is a front view of the cutting insert of FIG. 1.
Figure 4:
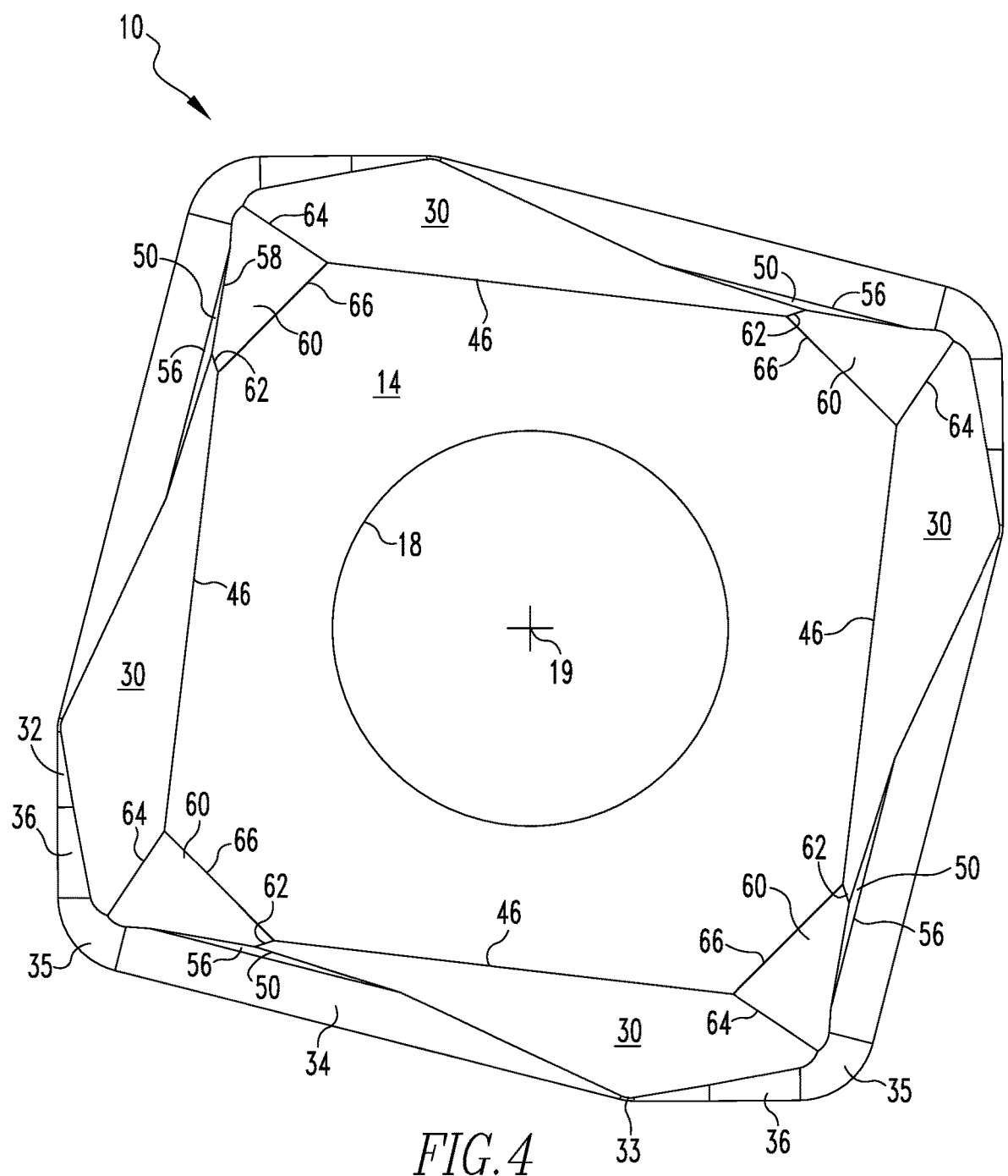
FIG. 4 is a rear view of the cutting insert of FIG. 1.
Figure 5:
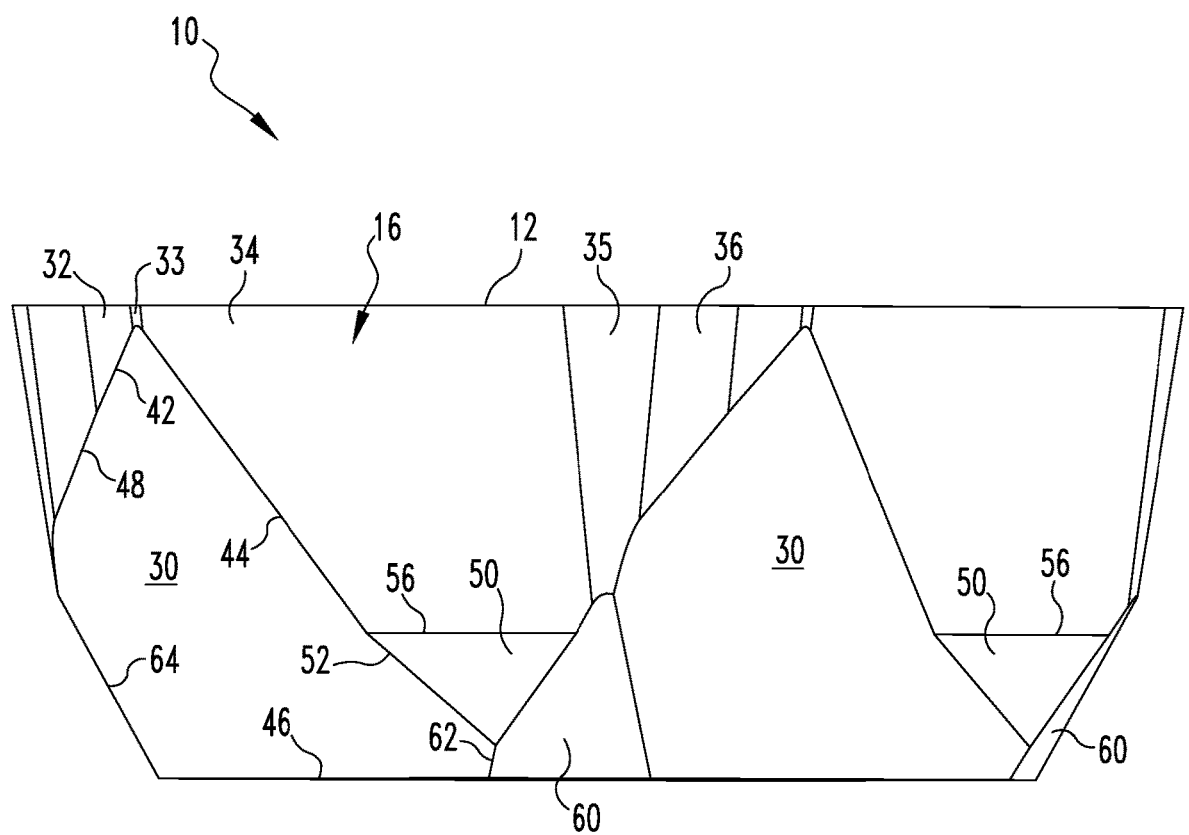
FIG. 5 is a side view of the cutting insert of FIG. 1.
Figure 6:
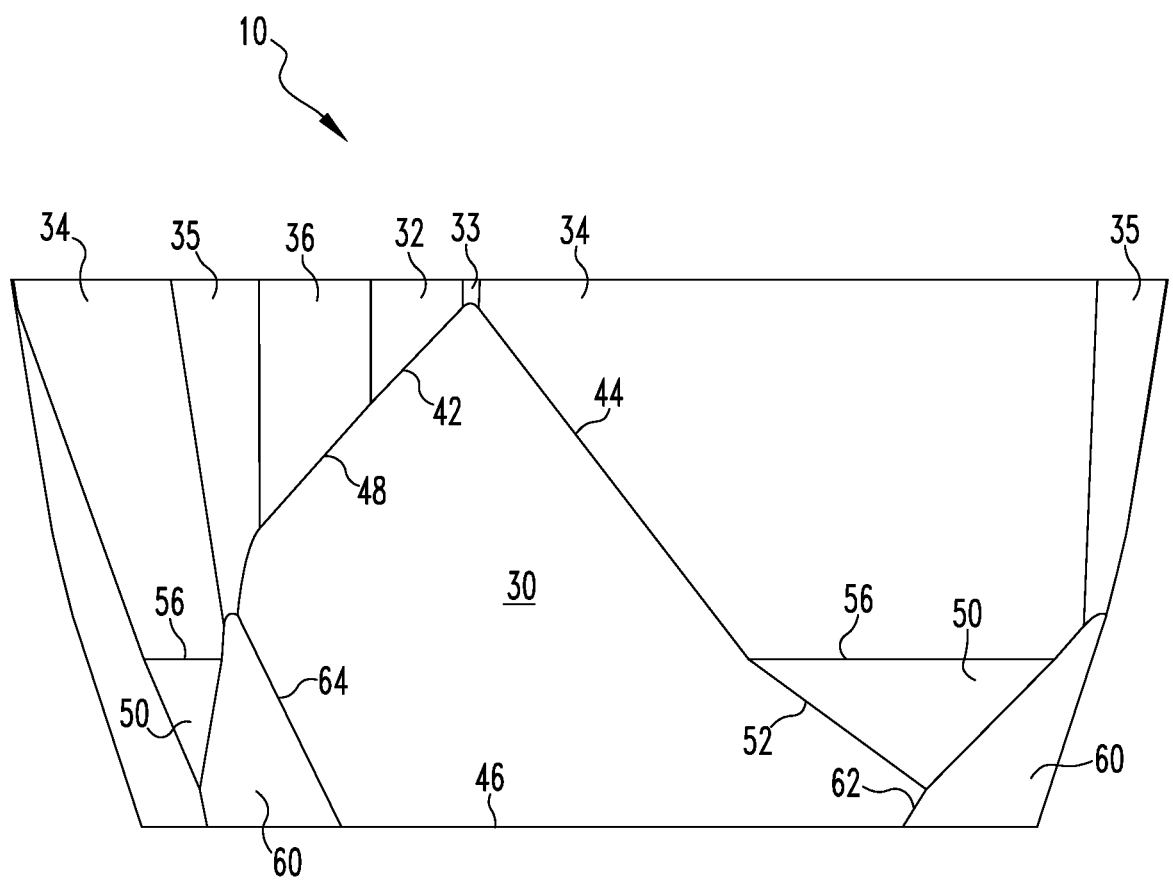
FIG. 6 is another side view of the cutting insert of FIG. 1.

The cutting insert 10 has four cutting edges 20. Each cutting edge 20 comprises a facet cutting edge 22, a straight angled lead cutting edge 24, a transition 23 between the facet and lead cutting edges 22 and 24, a curved cutting nose edge 25 and a straight clearance edge 26. The facet cutting edge 22, as shown in FIG. 3, is a straight edge. However, at least a portion of the facet cutting edge 22 may comprise a slightly curved edge.

As shown most clearly in FIGS. 1, 2, 5 and 6, each side face 16 includes a side seating surface 30. Each side face 16 also includes a side facet surface 32, a side transition surface 33, a side lead surface 34, a side nose surface 35 and a side clearance surface 36. Each side seating surface 30 is defined by boundary lines including a first forward seating surface boundary 42, a second forward seating surface boundary 44, a rear seating surface boundary 46 and a clearance surface boundary 48. The first forward seating surface boundary 42 intersects the side transition surface 33 and the side facet surface 32. The second forward seating surface boundary 44 intersects the side transition surface 33 and the side leading surface 34. The rear seating surface boundary 46 intersects the rear face 14. The clearance surface boundary 48 intersects the side clearance surface 36 and the side nose surface 35.

Each side lead surface 34 may lie in a plane that is non-orthogonal to the plane of the front face 12. The lead side surface 34 may form an angle with the plane of the front face 12 that provides a clearance, for example, the side lead surface angle measured between the planes of the front face 12 and side surface may be less than 90°, such as less than 89°, such as less than 88°, such as less than 85°. The side lead surface angle may typically range from less than 90° to 60°, such as from 89° to 70°, such as 88° to 72°, such as 85° to 75°. With such side lead surface angles, the plane of the lead cutting surface 34 is not parallel with the central longitudinal axis 19 of the cutting insert 10.

Each side face 16 includes a rear corner foot 50 that extends radially outward from the plane of its adjacent side lead surface 34. In the embodiment shown, the rear corner foot 50 has a planar surface extending from the side lead surface. However, at least a portion of the surface of the corner foot 50 may be non-planar such as curved. The rear corner foot 50 intersects the side seating surface 30 at a rear corner foot seating surface boundary 52. The rear corner foot seating surface boundary 52 provides a portion of the outer perimeter of the side seating surface 30. An inflection point is provided at the intersection of the rear corner foot seating surface boundary 52 and the second forward seating surface boundary 44, as shown most clearly in FIGS. 1, 2, 5 and 6. The rear corner foot 50 also intersects the side lead surface 34 at a rear corner intersection line 56. The rear corner intersection line 56 provides an inflection line between the planar side lead surface 34 and the planar surface of the rear corner foot 50.

A rear corner chamfer 60 is provided adjacent the rear face 14 of the cutting insert 12 in a region between adjacent side faces 16. The rear corner chamfer 60 intersects the rear corner foot 50 at a rear chamfer intersection line 58. The rear corner chamfer 60 forms a first rear corner chamfer seating surface boundary 62 and a second rear corner chamfer seating surface boundary 64. A rear edge 66 of the chamfer 60 intersects the rear face 14. The first rear corner chamfer seating surface boundary 62 forms part of the periphery of one of the side seating surfaces 30, while the second rear corner chamfer seating surface boundary 64 forms a portion of the perimeter of an adjacent side seating surface 30.

The rear corner chamfer 60 in the embodiment shown is planar and may be oriented at a chamfer angle measured from the central longitudinal axis 19 of the cutting insert 10 of at least 5°, such as at least 10°, such as at least 20°, such as at least 30°. For example, the chamfer angle may be from 5° to 60°, or from 10° to 50°, or from 20° to 40°.

Figure 7:
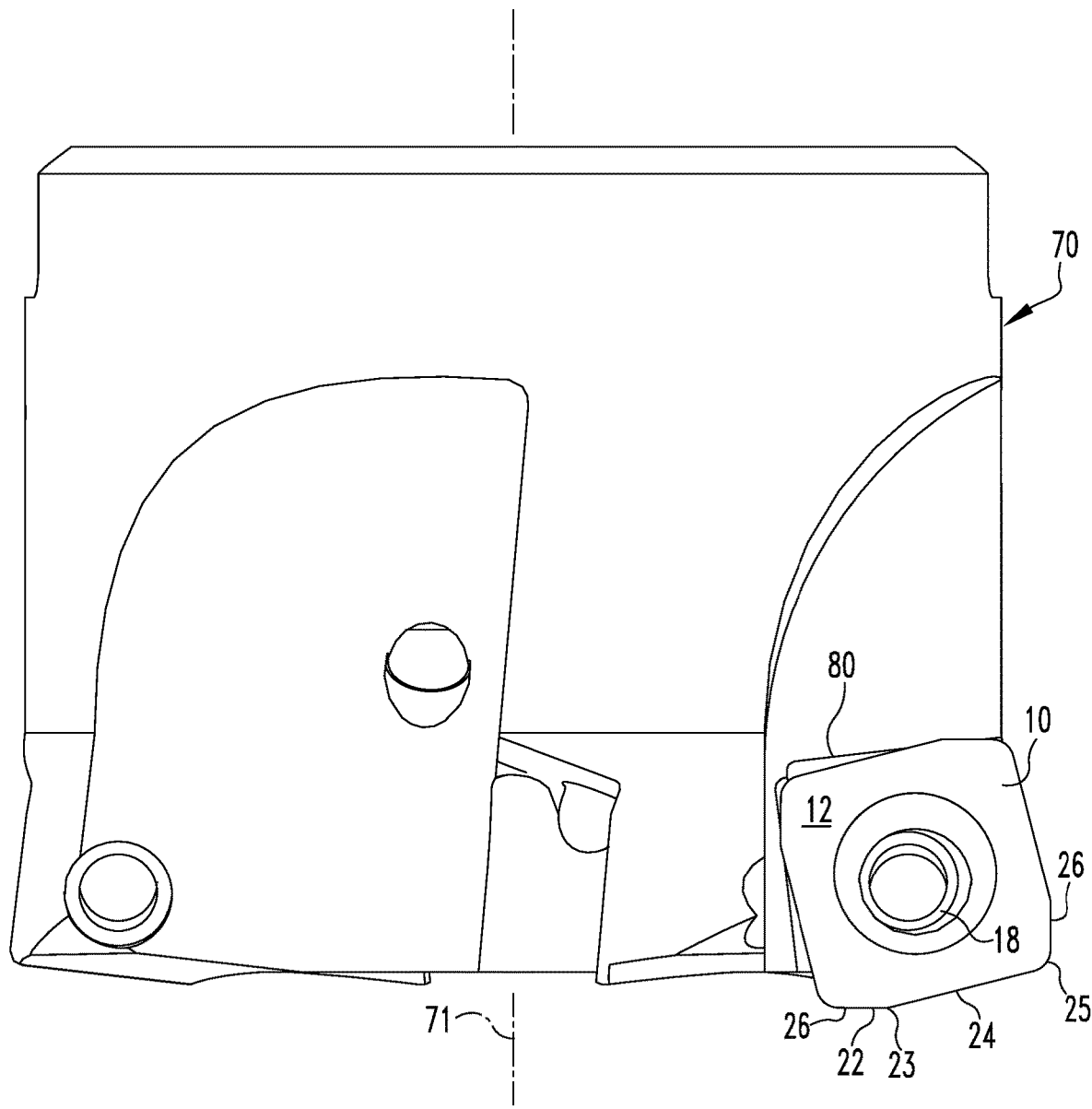
FIG. 7 is a side view of a rotatable cutting tool holder with cutting inserts of the present invention installed thereon.
Figure 8:
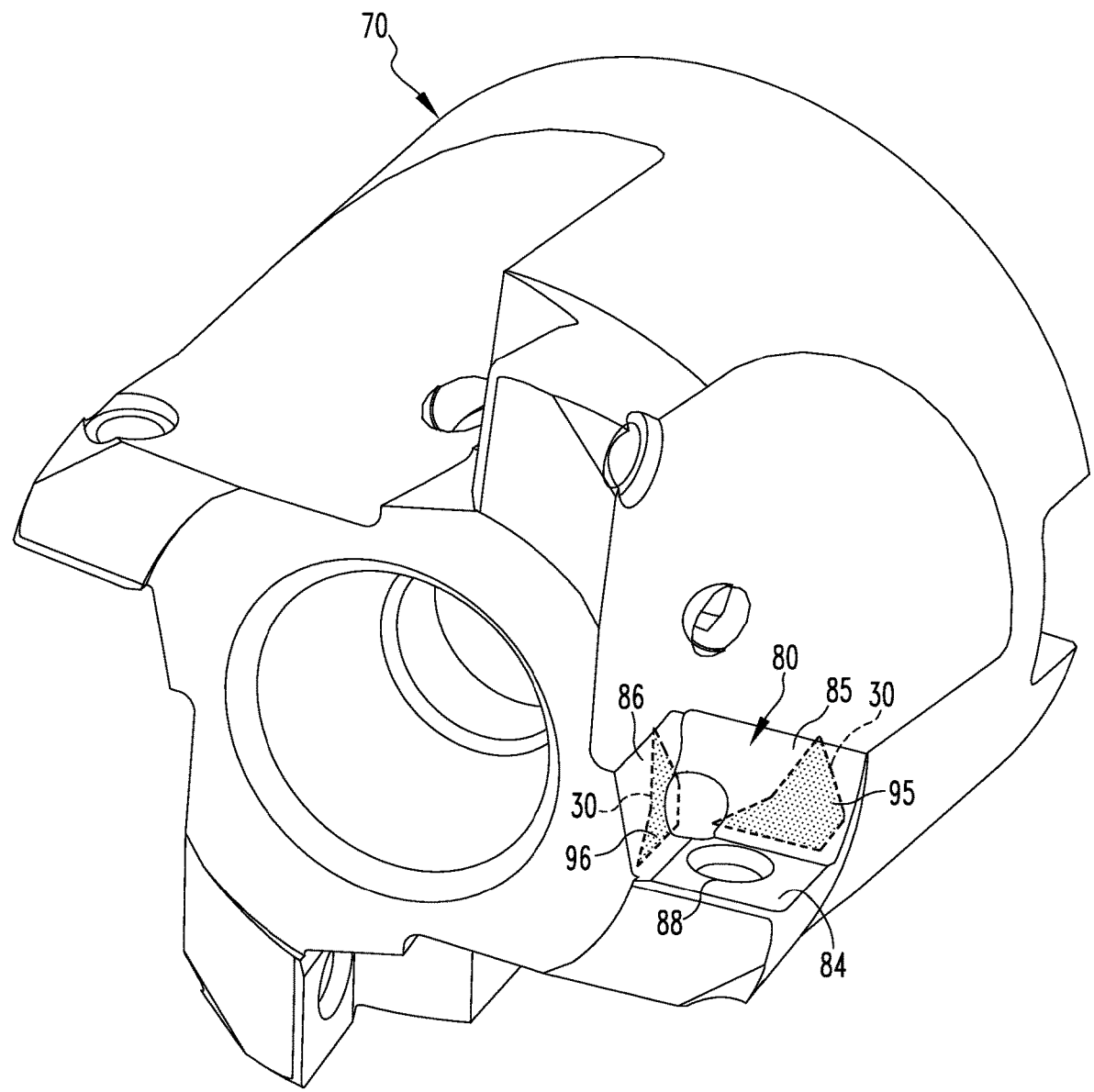
FIG. 8 is an isometric view of a rotatable cutting tool holder including pockets for receiving cutting inserts of the present invention.

As shown in FIGS. 7 and 8, a rotatable cutting tool holder 70 may have cutting inserts 10 of the present invention installed thereon. In the embodiment shown, the rotatable cutting tool holder 70 is in the form of a high feed face mill. However, the cutting inserts 10 of the present invention may be used with other cutting operations, such as slotting, plunging, ramping, drilling, turning, profiling and the like. The rotatable cutting tool holder 70 includes multiple cutting insert pockets 80, as more fully described below.

Each insert pocket 80 comprises a rear seating surface 84, a first sidewall portion 85 extending generally perpendicularly from the rear seating surface 82 and a second sidewall portion 86 extending generally perpendicularly from both the rear seating surface 84 and the first sidewall portion 85. The rear seating surface 84 is configured to engage with the rear face 14 of the cutting insert 10, the first sidewall portion 85 is configured to engage with one of the side faces 16 of the cutting insert 10, and the second sidewall portion 86 is configured to engage with another one of the side faces 16 of the cutting insert 10. The rear seating surface 84 of the insert pocket 80 includes a threaded mounting hole 88 configured to receive a conventional mechanical fastener (not shown) to secure the cutting insert 10 in the insert pocket 80.

As shown in FIG. 8, the first sidewall portion 85 of the cutting insert pocket 80 has a first sidewall seating surface 95 that corresponds to the contact surface that engages the side seating surface 30 that faces the first sidewall portion 85 of the pocket 80. The second sidewall portion 86 of the pocket 80 includes a second sidewall seating surface 86 that contacts at least a portion of the side seating surface 30 of the side face 16 facing the second sidewall portion 86.

Figure 9:
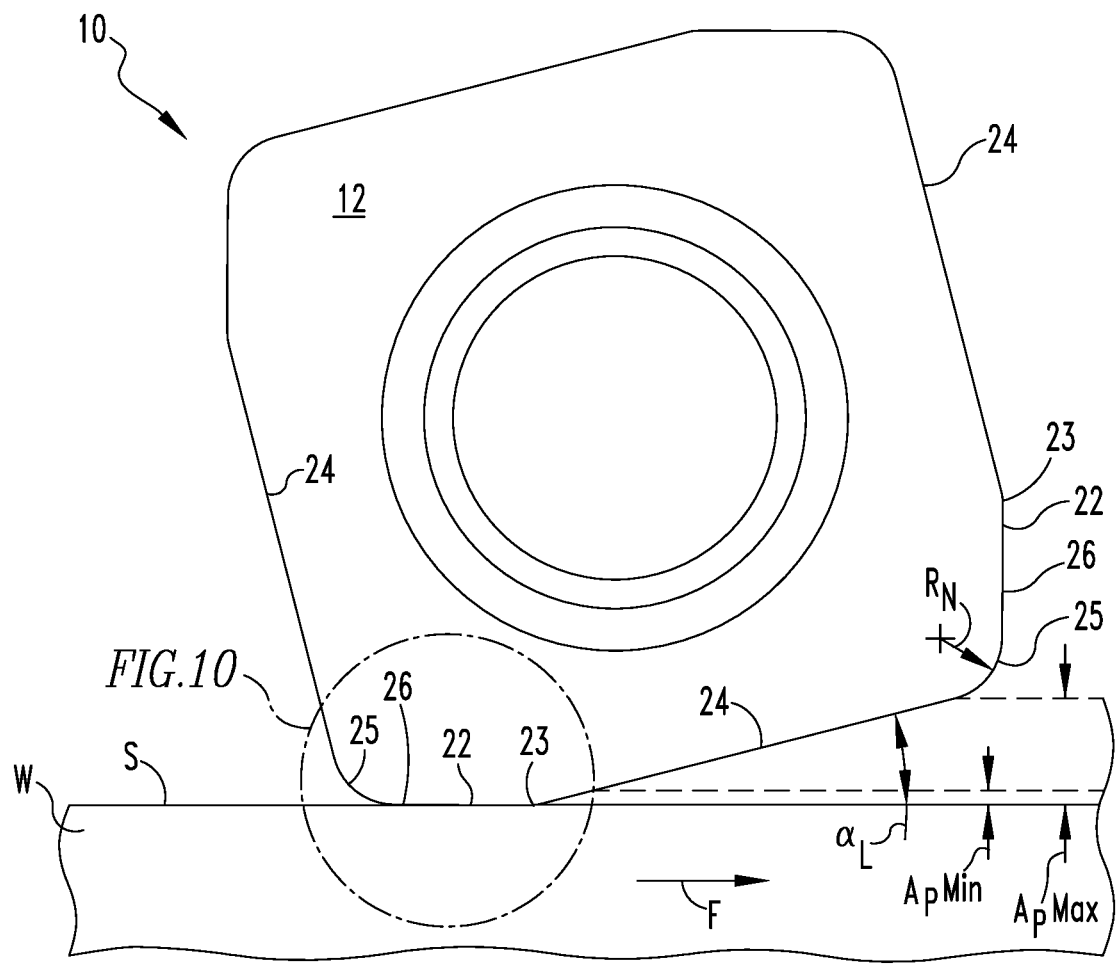
FIG. 9 is a front view of a cutting insert of the present invention schematically illustrating its use in a face milling operation.
Figure 10:
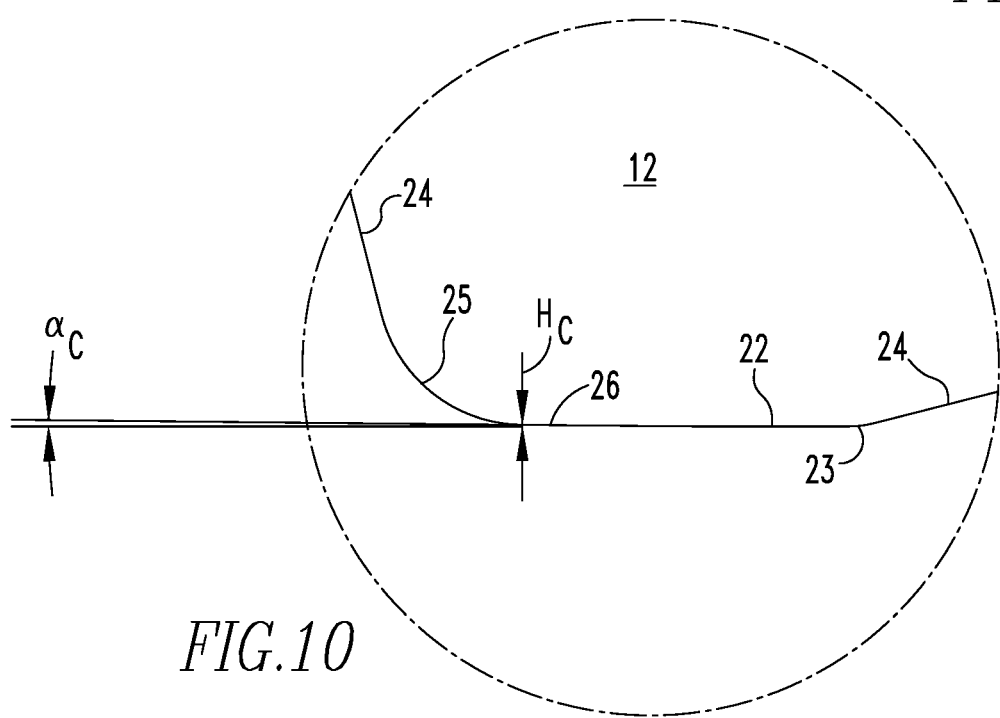
FIG. 10 is a magnified portion of FIG. 9 showing details of cutting edges of the cutting insert.

FIGS. 9 and 10 show various dimensions of the cutting insert 10, and schematically illustrate details of the cutting insert 10 and use of the insert during face milling operations. As shown in FIG. 9, the cutting insert 10 may be used in a face milling operation in which a workpiece W is milled to produce a flat milled surface S. The cutting tool holder 70 may be fed in a tool feed direction F in relation to the workpiece W. Alternatively, the cutting tool holder 70 and cutting inserts may be fed in a plunge direction P for plunging operations.

The angled lead cutting edge 24 is disposed at a lead cutting edge angle $\alpha_L$ that is measured from the facet cutting edge 22, which produces the final milled surface S of the workpiece W. As shown in FIG. 9, the lead cutting edge 24 has a lead cutting edge length $L_L$ along its straight edge from the transition 23 to the cutting nose edge 25, and has a lead cutting edge height $H_L$ measured from the facet cutting edge 22 and milled surface S to the point at which the straight lead cutting edge 24 terminates at the curved cutting nose edge 25. The facet cutting edge 22 has a facet cutting edge length $L_F$. The cutting nose edge 25 has a cutting nose edge radius of curvature $R_N$.

As shown most clearly in the magnified view of FIG. 10, the clearance edge 26 has a clearance edge angle $\alpha_C$ that is measured from the facet cutting edge 22, which provides a clearance space between the clearance edge 26 and the milled surface S of the workpiece W. The clearance edge 26 has length $L_C$ and defines a clearance edge height $H_C$ measured from the facet cutting edge 22 and milled surface S to the point at which the straight clearance edge 26 terminates at the curved cutting nose edge 25. The clearance edge height $H_C$ is also schematically shown in FIG. 3 in exaggerated form that is not to scale in order to more clearly illustrate the height $H_C$.

As shown in FIG. 9, the cutting insert 10 removes material from the workpiece W with a depth of cut Ap that may range from a minimum depth of cut ApMin to a maximum depth of cut ApMax, as selected by an operator of the milling tool.

The lead cutting edge 24 of the cutting insert 10 may be disposed at a lead cutting angle $\alpha_L$ measured from the facet cutting edge 22 of at least 5°, such as at least 8°, such as at least 10°, such as at least 12°, such as at least 16°, such as at least 17°. The lead cutting edge angle $\alpha_L$ of the lead cutting edge 24 may be no more than 40°, such as no more than 35°, such as no more than 25°, such as no more than 22°, such as no more than 20°, such as no more than 18°. The lead cutting angle $\alpha_L$ of the lead cutting edge 24 may be in a range of 5° to 40°, such as 8° to 35°, such as 10° to 25°, such as 12° to 22°, such as 16° to 20°, such as 17° to 18° with respect to the facet cutting edge.

The lead cutting edge 24 has a lead cutting edge length $L_L$ that may be at least 2.0 mm, such as at least 3.0 mm, such as at least 4.0 mm, such as at least 5.0 mm. The lead cutting edge length $L_L$ may be no more than 10.0 mm, such as no more than 9.0 mm such as no more than 8.0 mm, such as no more than 7.0 mm. The lead cutting edge length $L_L$ may be in a range of 2.0 mm to 10.0 mm, such as 3.0 mm to 9.0 mm, such as 4.0 mm to 8.0 mm, such as 5.0 mm to 7.0 mm.

The lead cutting edge 24 has a lead cutting edge height $H_L$ that may be at least 0.5 mm, such as at least 1.0 mm, such as at least 1.2 mm, such as at least 1.4 mm. The lead cutting edge height $H_L$ may be no more than 3.0 mm, such as no more than 2.0 mm, such as no more than 1.8 mm, such as no more than 1.6 mm. The lead cutting edge height $H_L$ may be in the range of 0.5 mm to 3.0 mm, such as 1.0 mm to 2.0 mm, such as 1.2 mm to 1.8 mm, such as 1.4 mm to 1.6 mm.

The facet cutting edge 22 has a facet cutting edge length $L_F$ that may be at least 0.3 mm, such as at least 0.5 mm, such as at least 0.8 mm. The facet cutting edge length $L_F$ may be no more than 3.0 mm, such as no more than 2.0 mm, such as no more than 1.5 mm. The facet cutting edge length $L_F$ may be in a range of 0.3 mm to 3.0 mm, such as 0.5 mm to 2.0 mm, such as 0.8 mm to 1.5 mm.

A ratio of the lead cutting edge length $L_L$ to the facet cutting edge length $L_F$ may be defined as $L_L:L_F$, and may be at least 1.5:1, such as at least 2:1, such as at least 3:1, such as at least 4:1. The ratio of the length of the lead cutting edge to the length of the facet cutting edge $L_L:L_F$ may be no more than 20:1, such as no more than 10:1, such as no more than 8:1, such as no more than 6:1. The $L_L:L_F$ ratio may be 1.5:1 to 20:1, such as 2:1 to 10:1, such as 3:1 to 8:1, such as 4:1 to 6:1.

The clearance edge 26 may be disposed at a clearance edge angle $\alpha_C$ measured from the facet cutting edge 22 of at least 0.1°, such as at least 0.2°, such as at least 0.5°, such as at least 1.0°, such as at least 1.5°. The clearance edge angle $\alpha_C$ may be no more than 5.0°, such as no more than 4.0°, such as no more than 3.0°, such as no more than 2.5°. The clearance angle $\alpha_C$ may be in the range of 0.1° to 5.0°, such as 0.5° to 4.0°, such as 1.0° to 3.0°, such as 1.5° to 2.5°.

The clearance edge 22 has a clearance edge length $L_C$ that may be at least 0.1 mm, such as at least 0.3 mm, such as at least 0.5 mm, such as at least 0.8 mm. The clearance edge $L_C$ may be no more than 3.0 mm, such as no more than 2.0 mm, such as no more than 1.5 mm. The clearance edge length $L_C$ may be in a range of 0.1 mm to 3.0 mm, such as 0.5 mm to 2.0 mm, such as 0.8 mm to 1.5 mm.

A ratio of the facet cutting edge length $L_F$ to the clearance edge length $L_C$, may be defined as $L_F:L_C$, and may be in a range of 10:1 to 0.1:1, such as 5:1 to 0.2:1, such as 2:1 to 0.5:1, such as 0.8:1 to 1.2:1.

As schematically shown in FIG. 3, the clearance edge height $H_C$ of the clearance edge 26 may be at least 0.01 mm, such as at least 0.05 mm. The clearance edge height $H_C$ may be no more than 0.2 mm, such as no more than 0.1 mm. The clearance edge height $H_C$ may be in the range of 0.01 mm to 0.2 mm, such as 0.05 mm to 0.1 mm.

As shown in FIGS. 3 and 9, the cutting nose edge 25 may have a cutting nose edge radius $R_N$ that may be at least 0.05 mm, such as at least 0.1 mm, such as a least 0.2 mm. The cutting nose edge radius $R_N$ may be no more than 5 mm, such as no more than 2 mm, such as no more than 1 mm. The cutting nose edge radius $R_N$ may be in a range of 0.05 to 5 mm, such as 0.1 to 2 mm, such as 0.2 to 1 mm.

Figure 11:
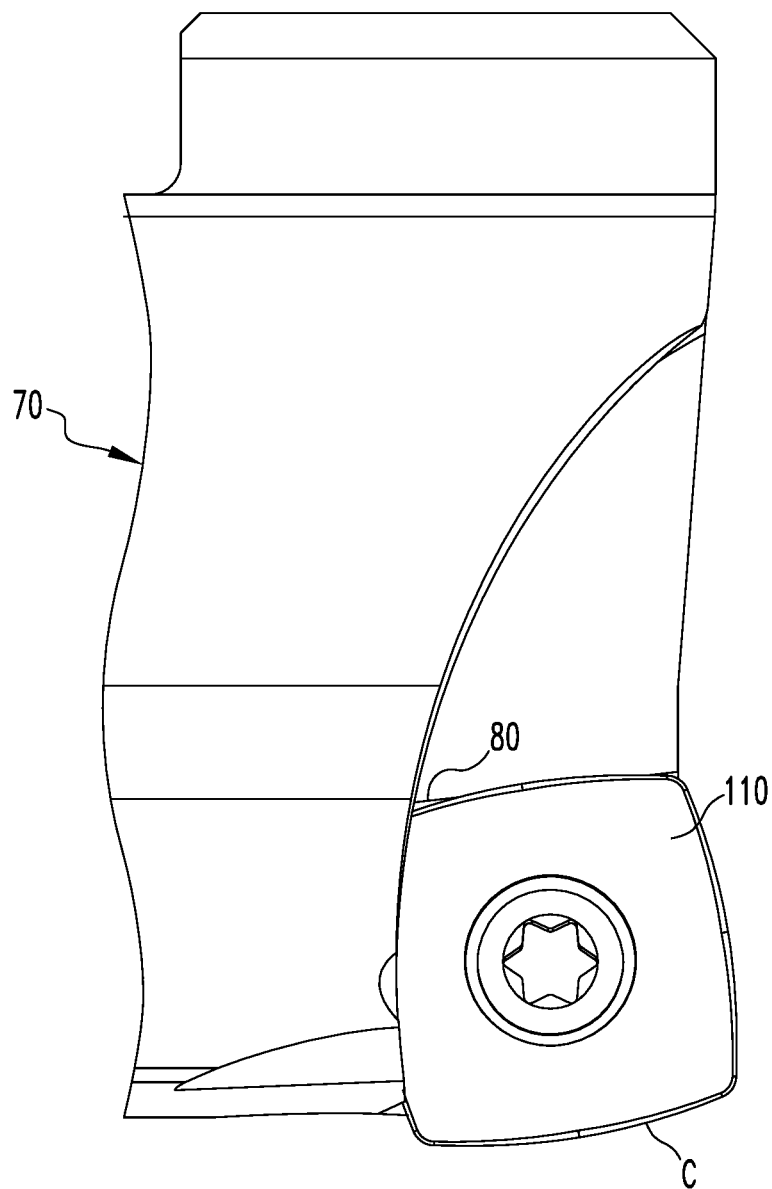
FIG. 11 is a side view of a portion of a rotatable cutting tool holder with a cutting insert having a curved main cutting edge installed thereon.

FIG. 11 illustrates a rotatable cutting tool holder 70 with a cutting insert pocket 80 as shown in FIGS. 7 and 8, but having a cutting insert 110 installed thereon that has a curved main cutting edge C. In accordance with an aspect of the present invention, cutting inserts 10 with straight lead cutting edges 24 may be used with cutting tool holders 70 that have conventionally been designed and operated with cutting inserts having curved main cutting edges C, such as shown in FIG. 11.

Cutting inserts of the present invention may exhibit favorable specific cutting energy characteristics, for example less than 50.0 W/cm³/min at varying feed rates of from 0.5 to 1.1 mm/Z. At higher feed rates Fz, e.g., greater than 0.9, or greater than 1.0, or greater than 1.1, the cutting insert may exhibit specific cutting energies of less than 40.0 W/cm³/min, or less than 38.0 W/cm³/min, or less than 36.0 W/cm³/min. As a particular example, the cutting inserts may exhibit a specific cutting energy of 50.0 W/cm³/min or less at a feed rate Fz of 0.5, and a specific cutting energy of 36.0 W/cm³/min or less at a feed rate Fz of 1.1.

EXAMPLES

Illustrative of the invention are the following examples that are not to be construed as limiting the invention to their details.

Cutting inserts as shown in FIGS. 1 to 6 and described wherein, 1, were tested in face milling operations and compared to conventional inserts, C1 to C7. Each of the conventional cutting inserts C1 to C7 have a generally square shape with four straight main cutting edges intersecting four corner edges that are slightly rounded.

For each test, four inserts were mounted in a rotatable cutting tool holder similar to that shown in FIGS. 7 and 11, commercially available from Kennametal Inc. under Model No. 7792 VXG 12 A63Z5R, with a size of 63 mm Z 5. Each test was run at a cutting speed (Vc) of 180 m/min, a cutting depth (Ap) of 1.00 mm, and a radial engagement (ae) of 28.0 mm.

Figure 12:
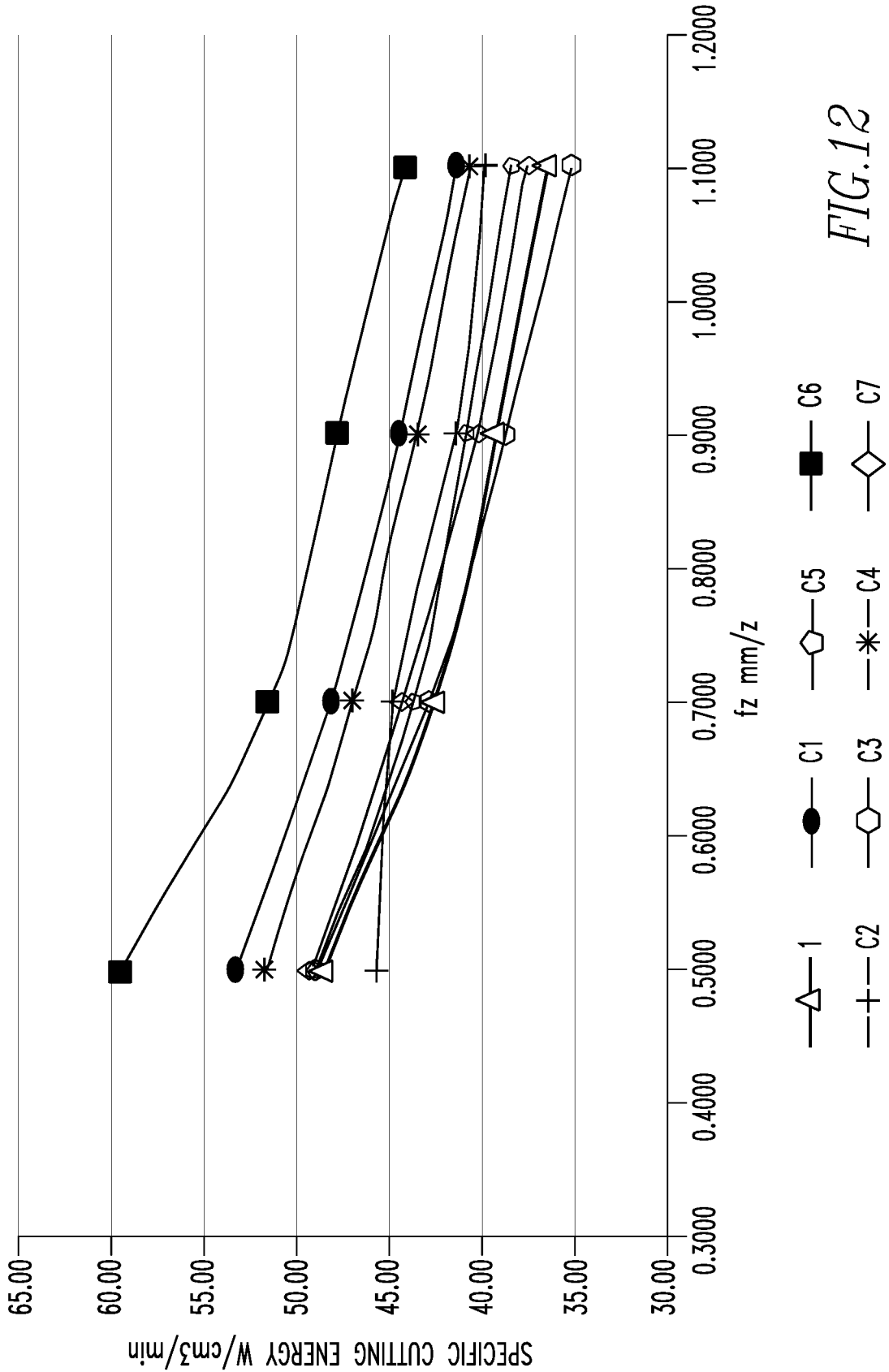
FIG. 12. is a graph of specific cutting energy vs. insert feed rates for a cutting insert of the present invention in comparison with other cutting inserts.

For each cutting operation, the specific cutting energy (Wc=Pc/MRR) was measured at various insert feed rates (Fz) by standard ISO KCT0757 and ISO KCT0665F03 test procedures. The specific cutting energy We is measured in units of Watts/cm³/min; the cutting power (Pc) is measured in units of kilowatts; and the metal removal rate (MMR) is measured in cm³/min. Measurements were made at Fz mm/Z, where Z is the number of inserts on the cutter. Each test was made at varying feed rates (Fz) of 0.5, 0.7, 0.9 and 1.1 mm/Z. The specific cutting energies for each set of inserts at each insert feed rate are shown in FIG. 12. In FIG. 12, lower curve levels demonstrate good cutting action and predict good performance level.

Figure 13:
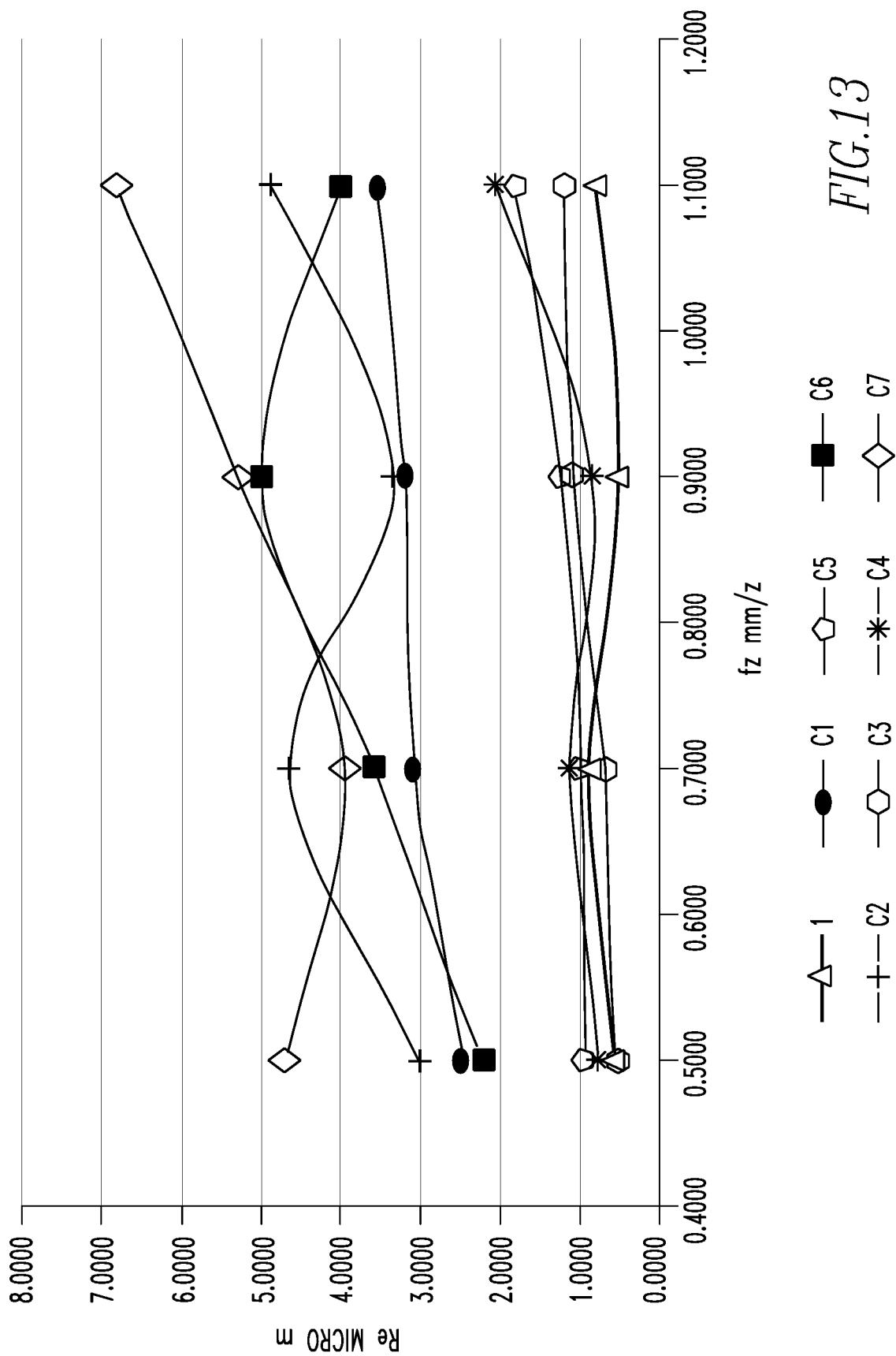
FIG. 13 is a graph of surface finishes (Ra) vs. insert feed rates for a cutting insert of the present invention in comparison with other cutting inserts.

Surface finishes were evaluated for each set of cutting operations. Surface finishes were measured by ISO 4287 Rev 1997—Surface texture: Profile method. Surface finish values (Ra) for each set of cutting inserts at varying feed/insert values are shown in FIG. 13. Surface finish Ra values of <1 μm are considered very good surface finishes.

From the graphs shown in FIGS. 12 and 13, it can be seen that cutting action of the cutting inserts of the present invention may be performed at lower cutting energies without significant amounts of stress to produce very good surface finishes and extended cutting times.

As used herein, "including," "containing" and like terms are understood in the context of this application to be synonymous with "comprising" and are therefore open-ended and do not exclude the presence of additional undescribed or unrecited elements, materials, phases or method steps. As used herein, "consisting of" is understood in the context of this application to exclude the presence of any unspecified element, material, phase or method step. As used herein, "consisting essentially of" is understood in the context of this application to include the specified elements, materials, phases, or method steps, where applicable, and to also include any unspecified elements, materials, phases, or method steps that do not materially affect the basic or novel characteristics of the invention.

For purposes of the description above, it is to be understood that the invention may assume various alternative variations and step sequences except where expressly specified to the contrary. Moreover, all numbers expressing, for example, quantities of ingredients used in the specification and claims, are to be understood as being modified in all instances by the term "about". Accordingly, unless indicated to the contrary, the numerical parameters set forth are approximations that may vary depending upon the desired properties to be obtained by the present invention. At the very least, and not as an attempt to limit the application of the doctrine of equivalents, each numerical parameter should at least be construed in light of the number of reported significant digits and by applying ordinary rounding techniques.

It should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. In this application, the articles "a," "an," and "the" include plural referents unless expressly and unequivocally limited to one referent.

Whereas particular embodiments of this invention have been described above for purposes of illustration, it will be evident to those skilled in the art that numerous variations of the details of the present invention may be made without departing from the invention as defined in the appended claims.

What is claimed is:

1. A cutting insert comprising:
a front face;
a rear face;
a plurality of side faces, wherein each side face extends between the front face and the rear face; and
a cutting edge at an intersection of the front face and each side face, wherein each cutting edge comprises:
a facet cutting edge; and
a straight angled lead cutting edge extending from the facet cutting edge at a lead cutting edge angle with respect to the facet cutting edge of from 5° to 40°, wherein the straight angled lead cutting edge extends to a cutting nose edge.

2. The cutting insert of claim 1, wherein at least a portion of the facet cutting edge is straight.

3. The cutting insert of claim 1, wherein the straight angles lead cutting edge angle is from 10° to 25°.

4. The cutting insert of claim 1, wherein the straight angled lead cutting edge is from greater than 2.0 mm to 10.0 mm in length, and the facet cutting edge is from 0.1 mm to less than 2.0 mm in length.

5. The cutting insert of claim 1, wherein a ratio of the length of the straight angled lead cutting edge to the length of the facet cutting edge is from 1.5:1 to 20:1.

6. The cutting insert of claim 1, further comprising a clearance edge extending from the facet cutting edge at a clearance edge angle of from 0.2° to 5.0° with respect to the facet cutting edge.

7. The cutting insert of claim 6, wherein a ratio of the length of the facet cutting edge to the length of the clearance edge is from 5:1 to 0.2:1.

8. The cutting insert of claim 1, wherein each side face comprises a side lead surface intersecting the straight angled lead cutting edge at a side lead surface angle measured from the front face of from less than 90° to 60°.

9. The cutting insert of claim 8, wherein each side face comprises:
a side seating surface; and
a rear corner foot extending from the side lead surface defining a rear corner intersection line with the side lead surface, wherein the side seating surface comprises:
a second forward seating surface boundary intersecting the side lead surface;
a rear seating surface boundary intersecting the rear face; and
a rear corner foot seating surface boundary intersecting the rear corner foot.

10. The cutting insert of claim 9, wherein the side lead surface comprises a planar surface.

11. The cutting insert of claim 1, further comprising a rear corner chamfer between adjacent ones of the side surfaces and intersecting the rear face disposed at an angle of from 10° to 50° measured from the central longitudinal axis.

12. A cutting insert for installation on a rotatable cutting tool holder, the cutting insert comprising:
a front face;
a rear face;
a plurality of side faces, wherein each side face extends between the front face and the rear face and comprises a side seating surface;
a cutting edge comprising a straight angled lead cutting edge at an intersection of the front face and a side lead surface of each side face; and
a rear corner foot extending from the side lead surface defining a rear corner intersection line with the side lead surface, wherein the side seating surface comprises:
a second forward seating surface boundary intersecting the side lead surface;
a rear seating surface boundary intersecting the rear face; and
a rear corner foot seating surface boundary intersecting the rear corner foot.

13. The cutting insert of claim 12, wherein the second forward seating surface boundary comprises a straight line.

14. The cutting insert of claim 13, wherein the rear corner foot seating surface boundary comprises a straight line.

15. The cutting insert of claim 14, wherein the straight line of the second forward seating surface boundary and the straight line of the rear corner foot seating surface boundary are angled with respect to each other and meet at an inflection point.

16. The cutting insert of claim 12, wherein the side lead surface comprises a planar surface, the rear corner foot comprises a planar surface, and the rear corner intersection line is straight.

17. The cutting insert of claim 12, further comprising a rear corner chamfer between adjacent ones of the side surfaces and intersecting the rear face, wherein the side seating surface comprises a first rear corner chamfer seating surface boundary intersecting the rear corner chamfer.

18. The cutting insert of claim 17, wherein the first rear corner chamfer seating surface boundary comprises a straight line.

19. The cutting insert of claim 17, wherein the rear seating surface boundary intersects the first rear corner chamfer seating surface boundary.

20. The cutting insert of claim 17, wherein the rear corner chamfer comprises a second rear corner chamfer seating surface boundary intersecting a side seating surface of an adjacent one of the side surfaces.

21. The cutting insert of claim 12, wherein the cutting edge comprises a facet cutting edge, and the straight angled lead cutting edge extends from the facet cutting edge at a lead cutting edge angle with respect to the facet cutting edge of from 5° to 40°.

22. A cutting tool assembly comprising:
a rotatable cutting tool holder having a longitudinal rotation axis and comprising a plurality of cutting insert pockets; and
a plurality of cutting inserts insertable into the cutting insert pockets, each cutting insert comprising:
a front face;
a rear face;
a plurality of side faces, wherein each side face extends between the front face and the rear face and comprises a side seating surface;
a cutting edge at an intersection of the front face and each side face, wherein each cutting edge comprises:
a facet cutting edge, and a straight angled lead cutting edge extending from the facet cutting edge at a lead cutting edge angle with respect to the facet cutting edge of from 5° to 40°,
and wherein each side face further comprises:
a side lead surface intersecting the straight angled lead cutting edge; and
a rear corner foot extending from the side lead surface defining a rear corner intersection line with the side lead surface, wherein the side seating surface comprises:
a forward seating surface boundary intersecting the side lead surface;
a rear seating surface boundary intersecting the rear face; and
a rear corner foot seating surface boundary intersecting the rear corner foot.

23. The cutting tool holder and cutting insert assembly of claim 22, wherein the side lead surface comprises a planar surface.

24. The cutting tool holder and cutting insert assembly of claim 23, wherein the side lead surface intersects the straight angled lead cutting edge at a side lead surface angle measured from the front face of from less than 90° to 60°.

25. A cutting insert comprising:
a front face;
a rear face;
a plurality of side faces, wherein each side face extends between the front face and the rear face; and
a cutting edge at an intersection of the front face and each side face, wherein each cutting edge comprises:
a facet cutting edge; and
a straight angled lead cutting edge extending from the facet cutting edge at a lead cutting edge angle with respect to the facet cutting edge of from 5° to 40°, wherein the cutting insert further comprises a clearance edge extending from the facet cutting edge at a clearance edge angle of from 0.2° to 5.0° with respect to the facet cutting edge.

26. A cutting insert comprising:
a front face;
a rear face;
a plurality of side faces, wherein each side face extends between the front face and the rear face; and
a cutting edge at an intersection of the front face and each side face, wherein each cutting edge comprises:
a facet cutting edge; and
a straight angled lead cutting edge extending from the facet cutting edge at a lead cutting edge angle with respect to the facet cutting edge of from 5° to 40°, wherein each side face comprises a side lead surface intersecting the straight angled lead cutting edge at a side lead surface angle measured from the front face of from less than 90° to 60°.

* * * * *